United States Patent
Story, Jr.

(10) Patent No.: US 9,112,844 B2
(45) Date of Patent: Aug. 18, 2015

(54) DEVICE CREDENTIALING FOR NETWORK ACCESS

(71) Applicant: Audible, Inc., Newark, NJ (US)

(72) Inventor: Guy A. Story, Jr., New York, NY (US)

(73) Assignee: Audible, Inc., Newark, NJ (US)

(*) Notice: Subject to any disclaimer, the term of this patent is extended or adjusted under 35 U.S.C. 154(b) by 1 day.

(21) Appl. No.: 13/707,522

(22) Filed: Dec. 6, 2012

(65) Prior Publication Data

US 2014/0165165 A1 Jun. 12, 2014

(51) Int. Cl.
*H04L 9/32* (2006.01)
*H04L 29/06* (2006.01)

(52) U.S. Cl.
CPC ............... *H04L 63/08* (2013.01); *H04L 63/20* (2013.01)

(58) Field of Classification Search
CPC ..... H04L 63/08; H04L 63/0861; H04L 63/10; H04L 63/101; H04L 63/102; H04L 63/104; H04L 63/20; H04L 63/205; H04L 29/08099; G06F 21/31; G06F 21/35; G06F 21/44
USPC .................. 726/1–7; 713/150, 155, 168–170, 713/182–186; 709/217–219, 225–229
See application file for complete search history.

(56) References Cited

U.S. PATENT DOCUMENTS

| | | | |
|---|---|---|---|
| 7,174,564 B1 * | 2/2007 | Weatherspoon et al. | 726/2 |
| 7,325,246 B1 * | 1/2008 | Halasz et al. | 726/2 |
| 7,685,629 B1 * | 3/2010 | White et al. | 726/2 |
| 8,140,863 B2 * | 3/2012 | Brown et al. | 713/193 |
| 8,302,152 B1 * | 10/2012 | Hewinson | 726/1 |
| 2006/0236105 A1 | 10/2006 | Brok et al. | |
| 2009/0298467 A1 | 12/2009 | Zohar | |
| 2010/0269151 A1 | 10/2010 | Crume | |
| 2011/0264730 A1 | 10/2011 | Dattagupta et al. | |

OTHER PUBLICATIONS

Cassavoy, "Store your Logins in Norton Identity Safe", retrieved on Dec. 5, 2012, at <<http://www.pcworld.com/article/260363/store_your_logins_in_norton_identity_safe.html>>, PCWorld, Aug. 13, 2012.

developer.apple.com/bonjour, retrieved on Dec. 5, 2012, at <<https://developer.apple.com/bonjour/>>, Apple, Inc.

developer.apple.com/library/mac/#documentation, retrieved on Dec. 5, 2012, at <<https://developer.apple.com/library/mac/#documentation/Cocoa/Conceptual/NetServices/Introduction.html>>, Apple, Inc.

(Continued)

*Primary Examiner* — Hosuk Song
(74) *Attorney, Agent, or Firm* — Lee & Hayes, PLLC

(57) ABSTRACT

Various embodiments provide techniques for sharing network service access credentials among multiple devices that share a common user or are associated in a device group. After connecting to a network service (e.g., a wireless network, wired network, or web site), a first device can upload the credentials used to access the network service to a cloud-hosted credential service. The credential service can store the credentials and associate them with the first device and/or its user. Later, a second device can log in to the credential service and receive a download of one or more sets of credentials to enable access to one or more network services that are authorized for the second device. Various embodiments include a credential management interface to enable an authorized user to manage device/network service pairings, permissions, and/or restrictions for network service access.

27 Claims, 10 Drawing Sheets

(56) References Cited

OTHER PUBLICATIONS identitysafe.norton.com retrieved on Dec. 5, 2012, at <<https://identitysafe.norton.com/>>, Symantec Corporation.

identitysafe.norton.com/features, retrieved on Dec. 5, 2012, at <<https://identitysafe.norton.com/features>>, Symantec Corporation.

identitysafe.norton.com/why-identity-safe, retrieved on Dec. 5, 2012, at <<https://identitysafe.norton.com/why-identity-safe>>, Symantec Corporation.

us.norton.com/products/tutorials/overview, retrieved on Dec. 5, 2012, at <<http://us.norton.com/products/tutorials/overview.jsp?pvid=n3604&tutid=norton_toolbar>>, Symantec Corporation.

"Welcome. You're watching Apple TV." Guide retrieved on Dec. 4, 2012, at <<http://manuals.info.apple.com/en_US/AppleTV_SetupGuide.pdf>>, Apple, Inc.

www-secure.symantec.com/norton-support, retrieved on Dec. 5, 2012, at <<https://www-secure.symantec.com/norton-suppor/jsp/help-solutions.jsp?docid=v74391114_EndUserProfile_en_us&product=home&pvid=f-home&version=1&lg=en&ct=us>>, Symantec Corporation.

www.apple.com/uk/appletv/specs, retrieved on Dec. 5, 2012, at <<http://www.apple.com/uk/appletv/specs.html>>, Apple, Inc.

Cassavoy, "Store your Logins in Norton Identity Safe", retrieved on Dec. 5, 2012, at <<http://www.pcworld.com/article/260363/store_your_logins_in_norton_identity_safe.html>>, PCWorld, Aug. 13, 2012, 1 page.

developer.apple.com/bonjour, retrieved on Dec. 5, 2012, at <<https://developer.apple.com/bonjour/>>, Apple, Inc., 1 page.

developer.apple.com/library/mac/#documentation, retrieved on Dec. 5, 2012, at <<https://developer.apple.com/library/mac/#documentation/Cocoa/Conceptual/NetServices/Introduction.html>>, Apple, Inc., 2 pages.

identitysafe.norton.com retrieved on Dec. 5, 2012, at <<https://identitysafe.norton.com/>>, Symantec Corporation, 2 pages.

identitysafe.norton.com/features, retrieved on Dec. 5, 2012, at <<https://identitysafe.norton.com/features>>, Symantec Corporation, 3 pages.

identitysafe.norton.com/why-identity-safe, retrieved on Dec. 5, 2012, at <<https://identitysafe.norton.com/why-identity-safe>>, Symantec Corporation, 3 pages.

The PCT Search Report and Written Opinion mailed May 15, 2014 for PCT application No. PCT/US13/73185, 11 pages.

us.norton.com/products/tutorials/overview, retrieved on Dec. 5, 2012, at <<http://us.norton.com/products/tutorials/overview.jsp?pvid=n3604&tutid=norton_toolbar>>, Symantec Corporation, 1 page.

"Welcome. You're watching Apple TV." Guide retrieved on Dec. 4, 2012, at <<http://manuals.info.apple.com/en_US/AppleTV_SetupGuide.pdf>>, Apple, Inc., 40 pages.

www-secure.symantec.com/norton-support, retrieved on Dec. 5, 2012, at <<https://www-secure.symantec.com/norton-support/jsp/help-solutions.jsp?docid=v74391114_EndUserProfile_en_us&product=home&pvid=f-home&version=1&lg=en&ct=us>>, Symantec Corporation, 1 page.

www.apple.com/uk/appletv/specs, retrieved on Dec. 5, 2012, at <<http://www.apple.com/uk/appletv/specs.html>>, Apple, Inc., 4 pages.

* cited by examiner

600

| NETWORK ID | SSID | PASSWORD |
|---|---|---|
| Home 1 | abcxyz | passwd1 |
| Work 1 | corp1 | passwd2 |
| Work 2 | corp2 | passwd3 |

602 — NETWORK ID
604 — SSID
606 — PASSWORD
608(1), 608(2), 608(N)

610

| CREDENTIAL SERVICE LOGIN | CREDENTIAL SERVICE PASSWD |
|---|---|
| janedoe | janepd1 |
| jsmith | jspdx |
| WSChen | 123456 |

612 — CREDENTIAL SERVICE LOGIN
614 — CREDENTIAL SERVICE PASSWD

620

| NETWORK ID | AUTHORIZED USER | AUTHORIZED DEVICE | RESTRICTIONS |
|---|---|---|---|
| Home 1 | janedoe | laptop1 | 0800 – 2300 |
| Home 1 | janedoe | phone0 | No AppX |
| Work 2 | WSChen | reader3 | none |
| Work 1 | janedoe | laptop1 | none |
| Work 1 | janedoe | phone0 | Weekdays |

622 — NETWORK ID
624 — AUTHORIZED USER
626 — AUTHORIZED DEVICE
628 — RESTRICTIONS
630(1), 630(2), 630(3), 630(4), 630(N)

FIG. 6

DEVICE CREDENTIALING FOR NETWORK ACCESS

BACKGROUND

For many people, life in the network-connected world involves managing multiple computing devices for business or personal use. In many cases, a user may have multiple computing devices (e.g., computers, phones, tablets, electronic book readers, and so forth) and the user may wish to provide each of these devices with access to a same service, such as a wireless or other network service. For example, a user may use multiple electronic book (eBook) reader devices and the user may want to configure each of them to connect to his/her home wireless network. In current practice, the user logs each device into the wireless network separately, repeating on each device the steps of launching that device's wireless network configuration utility, choosing the wireless network, and entering the appropriate credentials (e.g., user identifier and/or password). Such repetition may be tedious for the user and may be prone to data entry errors or other problems.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6 is a diagram depicting example data storage schema that store data utilized by a credential management service, according to various embodiments.

DETAILED DESCRIPTION

Overview

Figure 1:
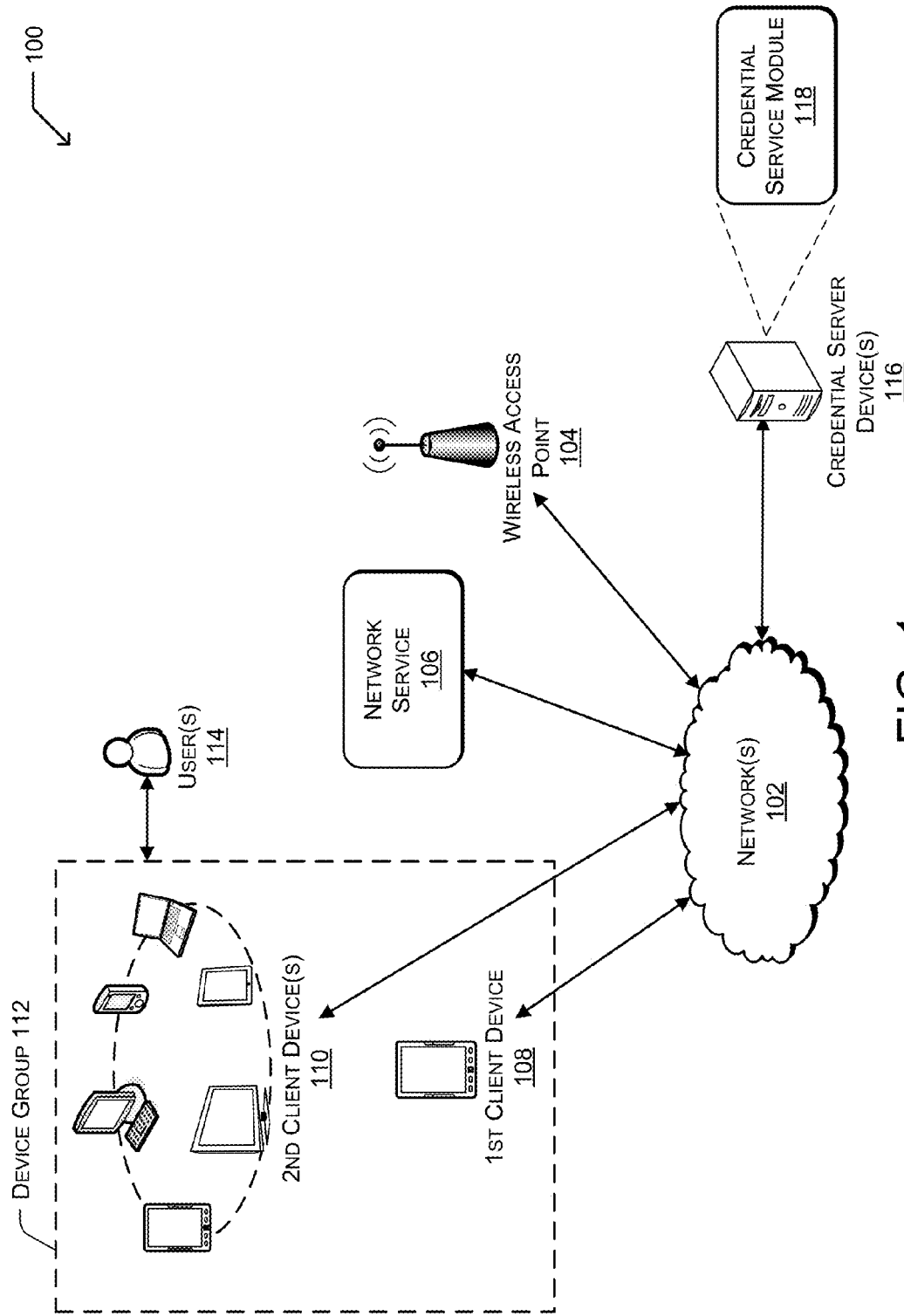
FIG. 1 is a block diagram depicting an example environment in which embodiments of a credential management service can operate.

Embodiments provide techniques for managing network service credentials for multiple client devices. As described further herein, embodiments provide a protocol by which network service access credentials (e.g., network service set identification (SSID), password, and so forth) can be stored for a user by a credential management service. In at least one embodiment, the credential management service is implemented in a hosted computing environment. The hosted computing environment may include one or more rapidly provisioned and released computing resources, which computing resources may include computing, networking and/or storage devices. A hosted computing environment may also be referred to as a cloud computing environment.

Any client device that has been registered for the user can periodically retrieve and store one or more sets of credentials from the credential management service, each set of credentials enabling access to a network service such as a wireless network service, wired network service, web service, e-commerce service, and so forth. When the client device is able to access one of the network services (e.g., when in range of a wireless network), the client device can automatically access, join and/or login to that service using the stored credentials. In this way, when one device belonging to a common device group, user and/or user account is authenticated to the credential management service, the credential management service can provide a bootstrapping technique by which multiple sets of network service credentials can be shared among all of the devices that belong to the common device group, user and/or user account. Thus, several embodiments can provide automatic access for a client device without the user manually entering the credentials for the network service. For example, the credential management service can enable the automatic connection of a second client device to various network services without the user of the second client device manually entering the network service credentials for each of the various network services.

In one example use scenario, a user can have multiple electronic book (eBook) reader devices that the user desires to connect to a home wireless network and a business wireless network (e.g., a wireless network for the user's office or place of work, or a wireless network of a business the user frequents). The user can manually enter the network credentials (e.g., SSID and password) to enable a first device to access the home network. Having established a connection to the home network, the user can then log into the credential management service through a secure login including a user name, password, or other security measures. A client-side application on the first device can provide the credentials for the home network to the credential management service, which stores the credentials for the home network and associates the credentials with the first device, a user account, and/or the user. For example, a device can be associated with multiple users using the same user account. Thus, as used herein, unless otherwise specifically stated, a "user" can refer to a "user account" and/or a "user." The user can similarly log into the business network, and the business network credentials can be provided to and stored on the credential management service. Accordingly, for each instance when a user connects a device to a network service, a process on the device can provide the connection-enabling credentials to the credential management service.

Continuing with this example, the user can later log in to the home network using a second device, again manually entering the credentials to establish a connection to the home network. Once the connection is established, the second device can access the credential management service and obtain all the sets of credentials for networks (or other network services) that are associated with the user, associated with the user account, and/or associated with a device group that includes both the first and second devices. In this example, the second device can receive and store a set of credentials to enable it to connect to the business network. When the second device is able to access the business network (e.g., when a wireless network transceiver of the second device detects the business network), the second device can establish a connection to the business network automatically without the user manually entering the credentials for the business network. In this way, the credential management service can provide a bootstrapping technique by which multiple sets of network service credentials including credentials for home and business networks can be shared among devices that share a common device group, user and/or user account.

Some embodiments also provide a management interface that a user can employ to manage authorized device-to-network pairings, manually enter network service access credentials, define restrictions on the use of a particular device and/or particular network service, and so forth. Various embodiments are described further with reference to FIGS. 1-8.

Illustrative Environment

FIG. 1 shows an example environment 100 in which embodiments of a credential management service can operate. In some embodiments, the various devices and/or components of environment 100 can communicate with one another and with external devices via one or more networks 102. For example, network(s) 102 can include public networks such as the Internet, private networks such as an institutional and/or personal intranet, or some combination of private and public networks. Network(s) 102 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 102 can utilize communications protocols, including packet-based and/or datagram-based protocols such as internet protocol (IP), transmission control protocol (TCP), user datagram protocol (UDP), or other types of protocols. Moreover, network(s) 102 can also include a number of devices that facilitate network communications and/or form a hardware basis for the networks, such as switches, routers, gateways, access points, firewalls, base stations, repeaters, backbone devices, and the like.

In some embodiments, network(s) 102 can further include devices that enable connection to a wireless network, such as wireless access point (WAP) 104. Embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In some embodiments, environment 100 includes one or more client devices, such as the first client device 108 or the second client device(s) 110. In one example, client device(s) 108 and 110 can include eBook readers or other devices that are able to connect to a network service such as a wireless network accessible through WAP 104, another wired or wireless network of network(s) 102, and/or other network service(s) 106. As used herein, a network service can include any service available via the Internet or other network, such as an e-commerce service; social networking service; gaming or entertainment service; content provider service; blog, microblog, news or information service; file-hosting service; web service; hosted computing service (a.k.a., cloud-based computing service), and other types of network services. In some instances, a network service is a web site.

For example, FIG. 1 depicts the first client device 108 as an eBook reader device and the second client device(s) 110 as a more diverse variety of device types. However, embodiments are not limited to any particular type of client device, and client device(s) 108 and 110 can include any type of computing device, including but not limited to desktop computers, personal computers, laptop computers, tablet computers, eBook readers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of device.

In some embodiments, first client device 108 and second client device(s) 110 can be associated with each other in a device group 112. Such a device group can be associated with one or more user account(s) and/or user(s) 114. For example, a single user 114 can own and/or operate first client device 108 and second client device(s) 110. As another example, a group of user(s) 114 (e.g., users related socially, in a family, in a business, or otherwise) can share a device group 112 that includes a first client device 108 and second client device(s) 110. As yet another example, a client device 110 can be associated with a group of user(s) 114 using the same user account. Embodiments support scenarios where the first client device 108 and second client device(s) 110 are a same type of device (e.g., multiple eBook readers, which can include multiple devices of the same type but different models), or are a different type of device (e.g., an eBook reader and a laptop computer).

In some embodiments, environment 100 includes one or more server computing devices such as credential server device(s) 116. Such server devices can include any type of computing device including, but not limited to, network servers, workstations, desktop computers, laptop computers, tablet computers, mobile computing devices, and the like. Further, the server devices shown can include one or more computing devices that operate in a cluster or other grouped configuration to share resources, balance load, increase performance, provide fail-over support or redundancy, or for other purposes.

In some embodiments, credential server device(s) 116 include one or more hardware components and/or software modules. For example, credential server device(s) 116 can include a credential service module 118 that operates to manage network service credentials uploaded by authorized client devices and/or to provide network service credentials to authorized client devices to enable those client devices to automatically access network services. When the client devices 108 and 110 are able to access the network services 106, the client devices 108 and 110 can establish a connection to the network services 106 automatically, without the user manually entering the credentials for the network services 106. In this way, if one device 108 or 110 from a device group 112, user and/or user account is authenticated to the credential management service, the credential management service can provide multiple sets of network service credentials, which can be shared among the devices 108 and 110 that are common to the device group 112, user and/or user account.

Illustrative Computing System Architectures

Figure 2:
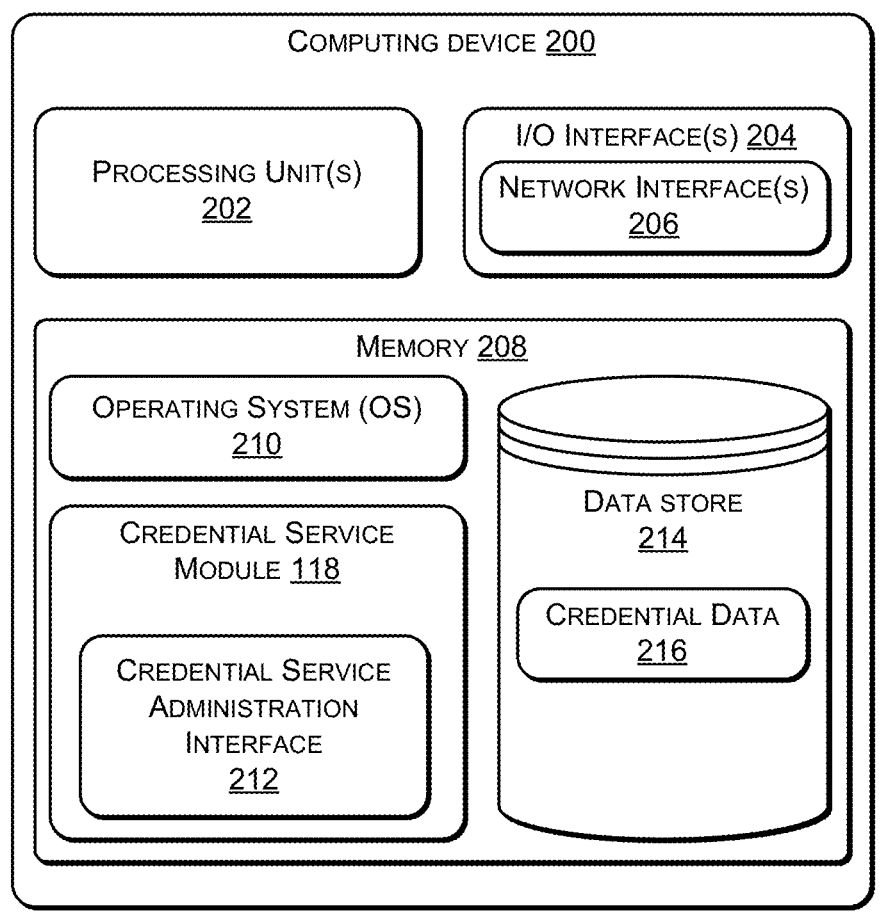
FIG. 2 is a block diagram depicting an example computing device which can perform operations of a credential management service, according to various embodiments.

FIG. 2 is a block diagram depicting an example computing device 200 which can perform operations of a credential management service. For example, computing device 200 may be credential server device(s) 116 as shown in FIG. 1. Computing device 200 can include one or more processing units 202 (e.g., processors) that execute computer-executable, processor-executable, and/or machine-executable instructions written in any suitable programming language to perform various functions described herein.

Computing device 200 can further include one or more input/output (I/O) interfaces 204 to allow computing device 200 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Computing device 200 can also include one or more network interfaces 206 to enable communications between computing device 200 and other networked devices over network(s) 102. Such network interface(s) 206 can include one or more network interface controllers (NICs) or other type of transceiver device to send and receive communications over a network.

As shown in FIG. 2, computing device 200 can also include memory 208. The memory 208 (and other memories described throughout) is an example of non-transitory computer-readable storage media and may include volatile, non-volatile memory, and/or other persistent and/or auxiliary non-transitory computer-readable storage media. Thus, the memory 208 may include, but is not limited to, RAM, ROM, EEPROM, flash memory, or other memory technology, or any other medium which can be used to store content, applications for access. In some embodiments, memory 208 stores one or more operating systems (OS) 210 and one or more modules, programs, or applications that are loadable and executable by processing unit(s) 202.

For example, memory 208 can store a credential service module 118 that operates to manage network service credentials provided by authorized client devices and/or to provide network service credentials to authorized client devices to enable those client devices to automatically access network services without the user manually entering the credentials for the network services. In some embodiments, credential service module 118 includes a credential service administration interface module 212. The credential service administration interface module 212 may generate instructions for presenting a user interface that enables a user to log in to the credential management service and manage the access rights of authorized devices to network services. Although FIG. 2 depicts credential service administration interface module 212 as part of credential service module 118, embodiments are not so limited and in some cases the interface module can operate as a separate module in communication with or accessing common data with credential service module 118.

In some embodiments, memory 208 can include a data store 214, such as a database, data warehouse, or other type of structured or unstructured data storage. In some embodiments, data store 214 includes a relational database with one or more tables, indices, stored procedures, and so forth to enable data access. Data store 214 can store data for the operations of processes, applications, components, and/or modules stored in memory 208 and/or executed by processing unit(s) 202. For example, data store 214 can store credential data 216 stored and accessible by credential service module 118. Thus, responsive to one device from a common device group, a common user and/or user account being authenticated to the credential management service, the credential service module 118 can provide a bootstrapping technique by which multiple sets of network service credentials from credential data 216, which are stored by data store 214, can be shared among devices belonging to the common device group, user and/or user account. Credential data 216 can include credentials enabling access to network services, such as logins, SSIDs, passwords, tokens, certificates, and the like.

Although FIG. 2 depicts a single computing device 200 which can perform operations of the credential management service, those skilled in the art will recognize that the credential management service may correspond to a logical association of one or more computing devices, such as an application server for providing network access credentials, a web server for creating and transmitting user interfaces, and a database server for storing credentials data. In some embodiments, the features and services provided by the credential management service may be implemented as web services consumable via the network(s) 102. In further embodiments, the credential management service is provided by one more virtual machines implemented in a hosted computing environment.

Figure 3:
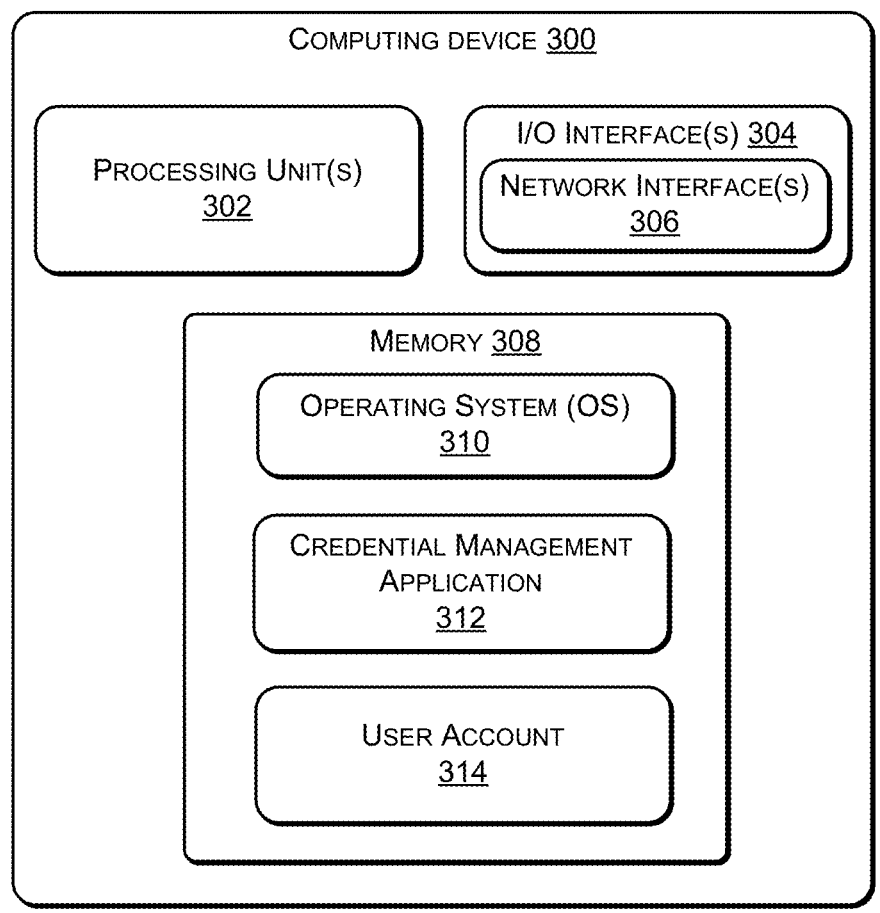
FIG. 3 is a block diagram depicting an example computing device (e.g., a client device) that communicates with a credential management service, according to various embodiments.

FIG. 3 is a block diagram depicting an example computing device that communicates with a credential management service. For example, computing device 300 may be a client device such as the first client device 108 and/or the second client device(s) 110 shown in FIG. 1. Computing device 300 can include processing unit(s) 302, I/O interface(s) 304, network interface(s) 306, memory 308, and operating system 310, each of which can be described similarly as above with regard to the corresponding components and modules of FIG. 2.

In some embodiments, memory 308 of computing device 300 can also store a credential management application 312. This (e.g., client-side) application can operate to provide network service credentials to the credential management service, receive network service credentials from the credential management service, locally store credentials received from the credential management service or entered by a user, and/or perform other operations with regard to the embodiments described herein.

Credential management application 312 can generate a user interface to enable a user to control transmission of credentials to and/or from the credential management service. In some embodiments, credential management application 312 may not generate a user interface, and such a headless application can function automatically to transmit credentials when the client device is able to access one of the network services (e.g., when in range of a wireless network), using the stored credentials. In this way, the credential management application 312 can use a bootstrapping technique by which multiple sets of network service credentials can be shared among client devices that share a common device group, user and/or user account, when one client device from the common device group, that common user and/or user account is authenticated to the credential management service. Thus, several embodiments can automatically transmit credentials from a client device without the user manually entering the credentials on the client device. Although credential management application 312 is depicted as a separate process, module or application, embodiments are not so limited. In some embodiments, operations of the credential management application 312 are, at least in part, performed by network interface(s) 306 or other components of computing device 300.

In some embodiments, memory 308 of computing device 300 can also include a user account application 314. One or more of these (e.g., client-side) applications can associate the computing device 300 with one or more users and can represent the one or more users to the credential management service. In various embodiments, all or part of user account application 314 can be included on other devices such as an additional client device 110 and/or computing device 200.

Memory 208 and memory 308 can include non-removable and/or removable computer-readable storage media, such as a hard drive, magnetic disk storage, optical disk storage, tape storage, storage arrays, storage area networks, network attached storage, storage in a hosted computing environment (a.k.a., cloud storage), and the like. Thus, memories 208 and 308 can provide volatile and/or non-volatile storage of computer readable instructions, data structures, program modules, and other data that can be used to program a computing device or processor, and thus, enable a computing device or processor to perform actions. The stored information can be stored in a compressed or uncompressed form. Moreover, memories 208 and 308 may be tangible and/or non-transitory forms of media included in a device and/or hardware component that is part of a device or external to a device, including but not limited to random-access memory (RAM), static random-access memory (SRAM), dynamic random-access memory (DRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other non-transitory memory, device, and/or medium that can be used to store and maintain information for access by a computing device.

Illustrative Processes

Figure 4:
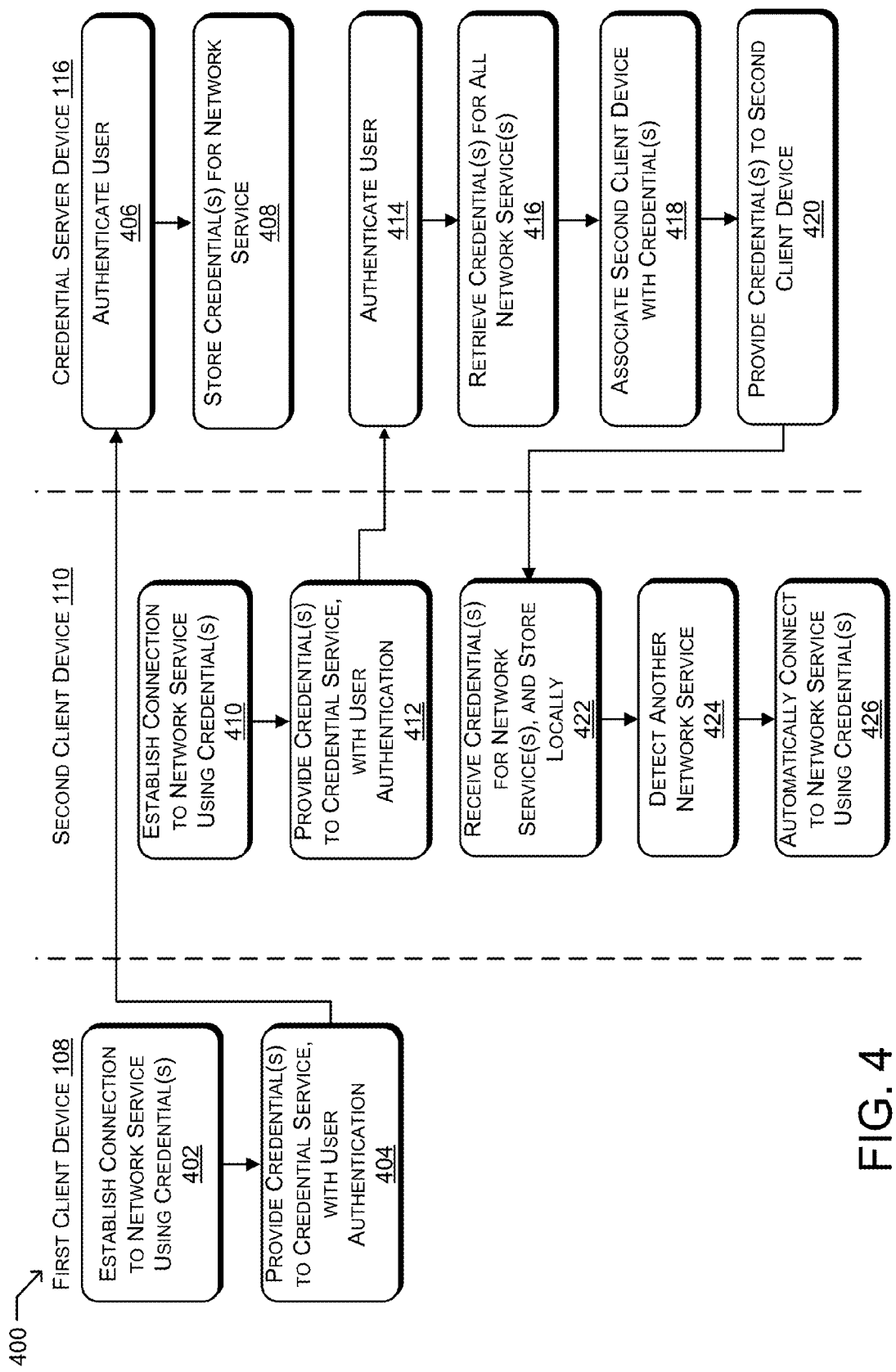
FIG. 4 is a flow diagram depicting an example processes for managing network service credentials, according to various embodiments.

FIG. 4 is a flow diagram depicting example processes for managing network service credentials. The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described process.

In the example shown in FIG. 4, process 400 includes operations performed by first client device 108, second client device 110 and credential server device 116. In some cases, the operations of first client device 108 and/or second client device 110 can be performed by credential management application 312, and the operations of credential server device 116 can be performed by credential service module 118.

At 402, the first client device 108 establishes a connection to a network service, using a set of credentials. In some embodiments, the first client device 108 establishes this connection through a user manually entering credential(s) via a user interface presented on the first client device 108. For example, where the network service is a website that includes a user authorization page to enable access, the user can enter credentials (e.g., a username and/or password) into appropriate fields on a login page. As another example, where the network service is a wireless network, the user can enter credentials (e.g., a network SSID and/or password) through a wireless networking user interface presented on first client device 108. In some embodiments, the credentials are stored locally in memory on the first client device 108.

At 404, the first client device 108 provides the credentials to the credential management service. In some embodiments, the first client device 108 makes a connection to a network service which in turn connects to the credential management service. The first client device 108 can provide credentials for additional network services in addition to the network service through which the first client device has established connection to the credential management service. In some cases, this can include a user authorization step in which a user of the first client device 108 provides an additional set of credentials to authenticate him/her to the credential management service. This additional set of credentials can include a login and/or password to access the credential management service.

In some embodiments, the first client device 108 provides the credentials to the credential management service automatically following the establishment of the connection between the first client device 108 and the network service. In other embodiments, the user indicates that the credentials are to be provided, via a user interface generated by the client-side credential management application 312 (or other component or module of the client device) and presented by the first client device 108. In some embodiments, the credential management application on the client device can have a user configurable setting to enable the user to set an option for automatically providing the credentials versus manually providing the credentials.

At 406, the credential server device 116 may authenticate the user based at least in part on the additional set of credentials provided by the user of the first client device 108 at 404. User authentication can be via credentials such as a login, username, password, biometric information, and the like. Some embodiments can include further security measures to ensure security of the network service credential information stored by the credential management service. For example, in some cases the connection between client device and credential management service can be over a secure network connection using a security protocol such as a Secure Sockets Layer (SSL) or a Transport Layer Security (TLS) protocol. Authentication can also include use of a certificate issued by a trusted certificate issuing party, to ensure that the user is accurately identified.

In some embodiments, the credentials to log into and/or be authenticated by the credential management service can be shared among a plurality of network services. For example, a user's login to the credential management service can function as a single login to also allow the user to access an e-commerce service, social networking service, gaming service, content provider service, or other network services.

At 408, if the user is properly authenticated at the credential management service, the credential server device 116 can store the received credential(s) for the network service. In some embodiments, the credential(s) are stored in memory 208 of the device or in a data store that is internal to or external to credential server device 116. In some embodiments, the stored credential(s) can be associated with the first client device 108 and/or its user, such that credential(s) for the particular network service are paired with the first client device 108 and/or its user. In this way, the credential management service can record that the first client device 108 and/or its user is authorized to access the network service using the stored credential(s). In some embodiments, the credential management service can also add the first client device 108 to a device group associated with the user.

After the credential(s) for the network service have been stored and associated with the first client device 108 and/or its user, at 410 a second client device 110 can establish a connection to the credential management service. In some embodiments, the second client device 110 makes a connection to a network service which in turn connects to the credential management service. This second authentication can then proceed similarly to that described above. For example, at 412, the second client device 110 can provide credentials to the credential management service. In some embodiments, the second client device 110 connects to the credential management service, and the second client device 110 provides the credentials to the credential management service. In some cases, this can include a user authorization step in which a user of the second client device 110 provides an additional set of credentials to authenticate him/her to the credential management service. This additional set of credentials can include a login and/or password to access the credential management service and/or a separate login and/or password to access network service 106.

In some embodiments, the second client device 110 provides the credentials to the credential management service automatically following the establishment of the connection between the second client device 110 and the network service. In other embodiments, the user indicates that the credentials are to be provided, via a user interface generated by the client-side credential management application 312 (or other component or module of the client device) and presented by the second client device 110. In yet other embodiments, the credential management application on the client device can have a user configurable setting to enable the user to set an option for automatically providing the credentials versus manually providing the credentials.

At 414, the credential server device 116 may authenticate the user based at least in part on the additional set of credentials provided by the user of the second client device 110 at 412. Again, this second authentication can proceed similarly to that described above. Once the credential management service has authenticated the user at 414, the credential server device 116 can retrieve, at 416, one or more sets of credentials for the various network service(s) that the user and/or the second client device is authorized to access. In cases where the first and second client devices are in a common device group and/or share a common user, the credential server device 116 can determine that the second client device 110 is authorized to receive the network service credentials previously provided by the first client device 108 at 404.

Next, at 418, the credential server device 116 can associate the second client device 110 with the set of credential(s) (including those previously provided by the first client device 108), and thus, record that the second client device 110 has been provided with the credential(s) and/or is authorized to access the various network service(s) for which network credentials have already been given. Thus, at 420 the credential server device 116 can provide the second device the one or more sets of credentials for the various network service(s) that the user and/or the second client device is authorized to access.

At 422, the second client device 110 receives the network service credential(s) from the credential management service and stores them locally. In various instances, the second client device 110 can receive the network service credential(s) directly from the credential management service, via the network service through which the second client device 110 established connection to the credential management service.

Alternatively, the second client device 110 can receive the network service credential(s) by virtue of the credential management service periodically providing updates to the list of network services and/or the associated credentials for which client devices of a common device group are authorized access. The credential management service can periodically push these updates to the client devices belonging to the common device group and/or can provide these updates the next time each of a client device belonging to the common device group connects to an authorized network service. Then, when the second client device 110 subsequently detects a presence of another network service, at 424, which is one of the various network service(s) that the user and/or the second client device is authorized to access, the second client device 110 can use the credentials received from the credential management service to automatically connect to the another network service at 426. In this way, the credential management service can enable the automatic connection of the second client device to various network services without the user of the second client device manually entering the network service credentials for each of the various network services.

Detection of the another network service at 424 can proceed in various ways depending on the particular network service the second client device 110 is accessing. For example, where the another network service is a wireless network, detection of the network service can include a network interface controller on the client device detecting a signal indicating that it is in communication range of the wireless network. In such cases, the network interface controller or other component of the client device can retrieve the network credentials previously downloaded and use them to automatically connect to the wireless network at 426.

As another example, where the another network service is a web site or other network accessible resource, detection of the another network service can include detecting that a user has launched a browser or other application and is at a login page or other authentication step to access the web site. In such cases, the credential management application 312 of the client device 108 or 110 can auto-populate the login page with the previously loaded credentials and thus use them to automatically access the web site at 426.

Figure 5A:
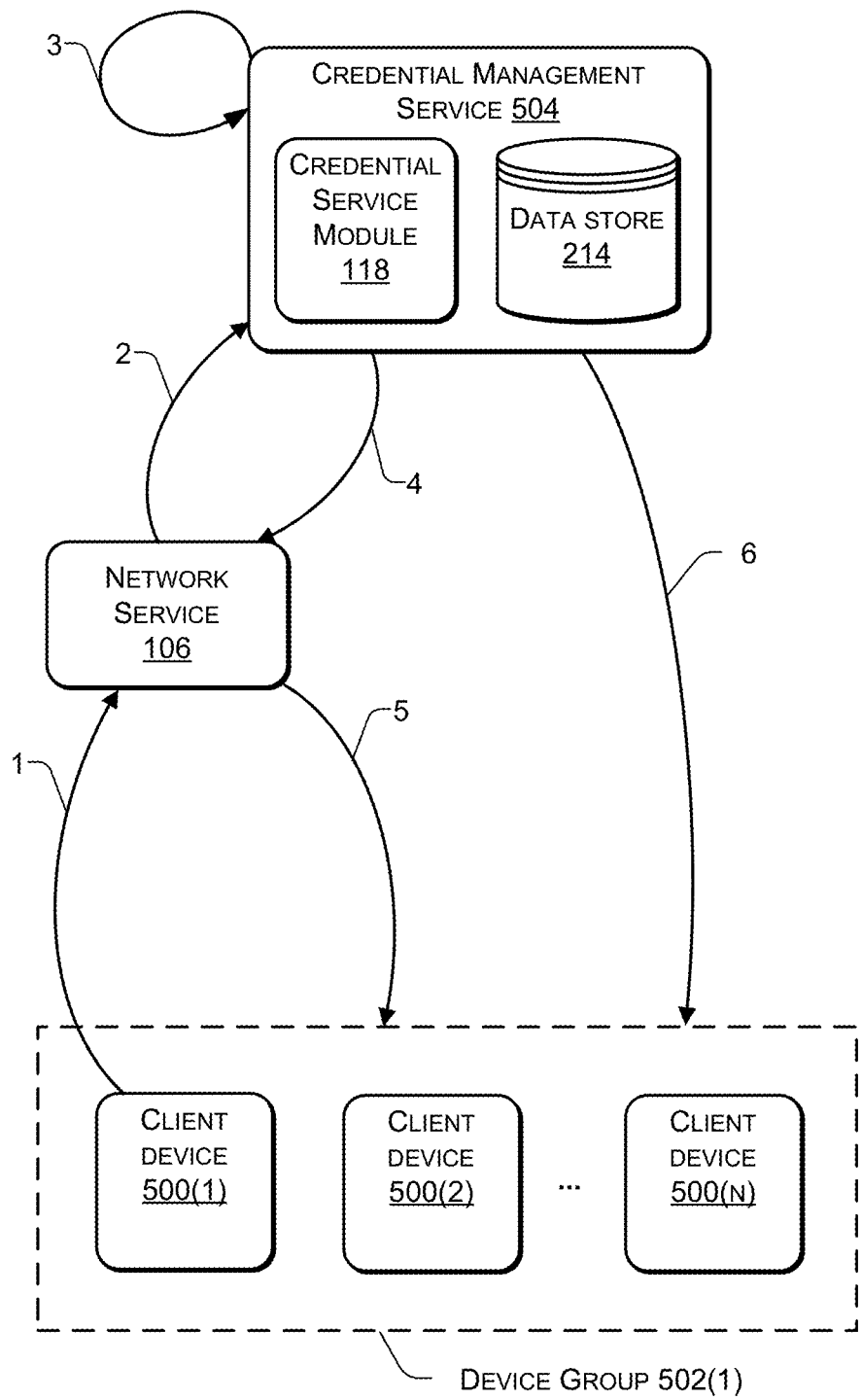
FIGS. 5A, 5B and 5C are state diagrams illustrating the flow of information among client devices belonging to groups, a credential management service, and network services according to some embodiments.
Figure 5B:
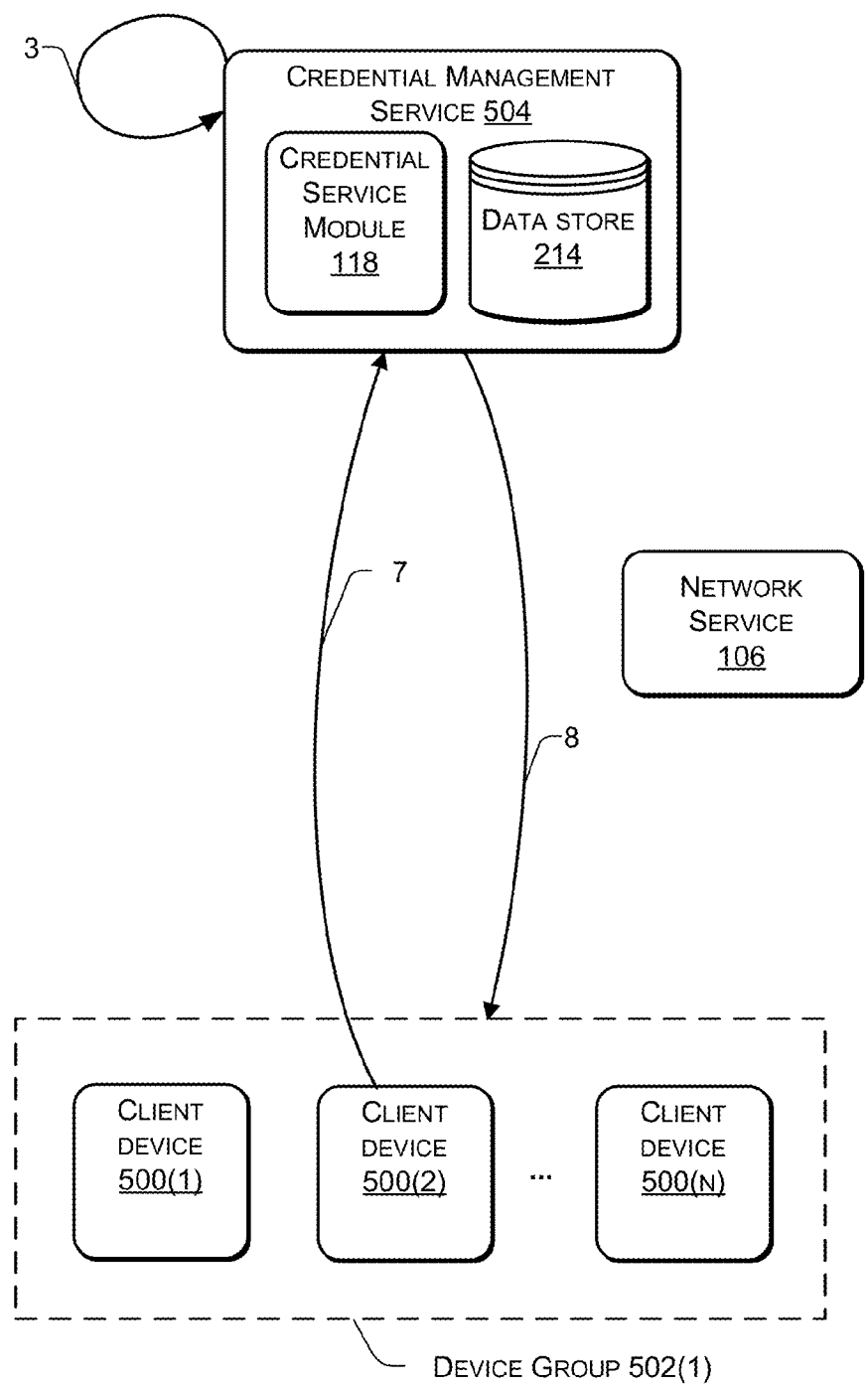
Figure 5C:
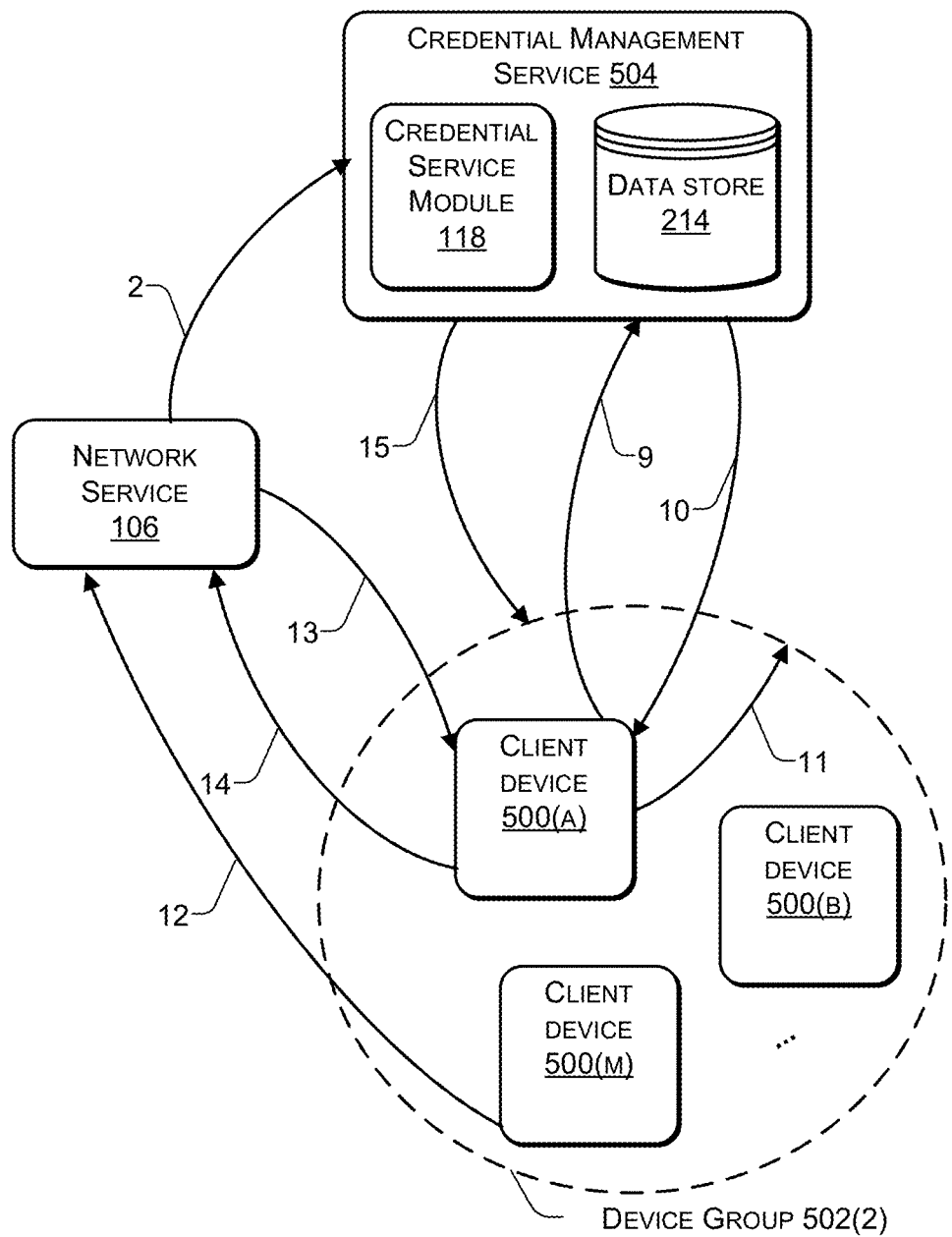

FIGS. 5A, 5B and 5C are state diagrams illustrating example processes of dynamically updating credentials for devices client devices 500(1)-(N) belonging to a device group 502 (which is consistent with device group 112), that are also registered with the credential management service 504 such as that implemented by credential server device 116, and at least one network service 106. The example processes are described in the contexts of FIGS. 1-4 but are not limited to those contexts. The order in which the operations are described in each example is not intended to be construed as a limitation, and any number of the described events can be combined in any order and/or in parallel in various implementations. Furthermore, additional, different and/or fewer operations than those shown in these examples may be included including deletion of authorization for a network service, such as when a subscription expires.

FIG. 5A is a state diagram illustrating the flow of information between client devices 500(1)-(N) belonging to an example of a device group 502(1) consistent with device group 112, a credential management service 504 such as that implemented by credential server device 116, and network service 106, while dynamically updating credentials for the devices of device group 502(1).

In event 1, a first computing device 500(1) uses a set of credentials to establish a connection to a network service 106. Similar to the earlier discussion, in some embodiments, a user manually entering credential(s) via a user interface presented on the first client device 500(1) can initiate this connection. In some embodiments, the credentials are stored locally in memory on the first client device 500(1).

As depicted by event 2, the network service 106 can provide the credential(s) to credential management service 504. Alternately, in some embodiments, a connection can be made between the first client device 500(1) and the credential management service 504, and the credentials can be provided by the client device 500(1) to the credential management service 504 rather than to the network service 106. In some cases, this can include a user authorization step in which a user of the first client device 500(1) provides an additional set of credentials to authenticate the user and/or the client device 500(1) to the credential management service 504. This additional set of credentials can include a login and/or password to access the credential management service 504.

In event 3, the credential management service 504 authenticates the first client device 500(1), stores the credentials for network service 106, and generates a device group 502(1) associated with first client device 500(1). In some instances, event 3 includes the credential management service 504 associating other client devices with device group 502(1) based on having a common user or user instructions to perform the association. As depicted by event 4, the credential management service 504 provides to network service 106, identification of devices belonging to device group 502(1) and authorization for the devices belonging to device group 502(1) to access network service 106 according to the credentials received for device group 502(1). The credential management service 504 can provide authorization for the network service 106 to provide the credentials received in event 1 to device group 502(1) or to provide an alternate authorization to device group 502(1) so that the network service 106 does not retransmit the credentials. In some embodiments, in event 5, network service 106 provides the credentials received in event 1 to device group 502(1) or the alternate authorization received from credential management service 504 to device group 502(1) so that each of the devices 500 in device group 502(1) can use the credentials from event 1 to access network service 106. Alternately, in some embodiments, in event 6, credential management service 504 provides the credentials received in event 1 to device group 502(1) or the alternate authorization for network service 106 to device group 502(1) so that each of the devices 500 in device group 502(1) can use the credentials from event 1 to access network service 106.

In various embodiments, a second client device, such as device 500(2) belonging to device group 502(1), can also connect to credential management service 504 to receive updated credentials for each of the network services that one or more of the devices 500(1)-(N) belonging to device group 502(1) have accessed. In such embodiments, credential management service 504 provides updated credentials to each of the devices 500(1)-(N) belonging to device group 502(1). Thus, when a next client device, such as client device 500(2) detects a network service 106 for which any of the devices 500 of device group 502(1) have provided credentials, device 500(2) can connect to the detected network service 106 and provide the credentials to access the network service 106. That is, according to the discussion above, during event 5 or event 6 the credentials received in event 1 or the alternate authorization received from credential management service 504 propagates to each of the devices 500 of device group 502(1). More particularly, in event 5, network service 106 has provided the credentials received in event 1 to device group 502(1) or the alternate authorization received from credential management service 504 to device group 502(1) so that each of the devices 500 in device group 502(1), including device 500(2), can use the credentials from event 1 to access network service 106. Alternately, in some embodiments, in event 6, credential management service 504 has provided the credentials received in event 1 to device group 502(1) or the alternate authorization for network service 106 to device group 502(1) so that each of the devices 500 in device group 502(1), including device 500(2), can use the credentials from event 1 to access network service 106.

FIG. 5B is a state diagram illustrating an alternative flow of information between client devices 500(1)-(N) and the credential management service 504. In some embodiments, as depicted by event 7, a client device 500(2) belonging to device group 502(1) can communicate with credential management service 504 to request updated credentials for each of the network services that one or more of the devices 500(1)-(N) belonging to device group 502(1) have accessed. In event 8, the credential management service 504 provides an updated list of network services associated with device group 502(1) and an updated list of credentials to each of the devices 500 belonging to device group 502(1) so that users do not need to provide credentials each time they access a network service from one of their devices. Thus, when a next client device 500(N) of device group 502(1) detects a network 106 for which any of the devices 500(1)-(N) of device group 502(1) have already provided credentials, device 500(N) can automatically connect to the detected network service 106 and provide the credentials to access the network 106.

In various embodiments, periodically or each time that a client device 500(1)-(N) of device group 502(1) establishes a connection to credential management service 504 or to a network service 106 associated with device group 502(1), the client device receives an updated list of networks and credentials that the device is authorized to access due to its inclusion in device group 502(1). In this manner, credential management service 504 maintains a schema of stored network service credential information for each device group 502, and corresponding schema are dynamically updated and provided to each client device 500 belonging to the group.

FIG. 5C is a state diagram illustrating an alternative flow of information between client devices 500(A)-(M) when dynamically updating network credentials. In some implementations, a particular device of a device group 502(2) may operate as a controlling device for that device group. For example, such an arrangement may be preferred for devices deployed in an enterprise, scholastic, or family environment. Device group 502(2) represents an arrangement including a controlling client device 500(A).

As depicted by event 9, client device 500(A) belonging to device group 502(2) can connect to credential management service 504 to receive updated credentials for each of the network services that one or more of the devices 500(A)-(M) belonging to device group 502(2) have accessed. In event 10, credential management service 504 provides updated credentials to client device 500(A). Then, in event 11, client device 500(A) provides the updated credentials to each of the other devices 500(B)-(M) belonging to device group 502(2), for example via a wireless network connection, the next time any of the client devices 500(B)-(M) associated with device group 502(2) access the wireless network.

Event 12 illustrates another event in the arrangement of device group 502(2). In event 12, client device 500(M) requests a connection to a network service 106. Responsive to an indication received with the request, network service 106 can recognize or establish that client device 500(M) is a member of device group 502(2). Accordingly, in event 13, network service 106 can provide the request to client device 500(A), and in event 14, client device 500(A) can provide credentials to network service 106. Thereafter, network service 106 communicates the credentials to credential management service 504 in an event similar to event 2, and credential management service 504 correspondingly processes the credentials in an event similar to event 3, before, in event 15, providing the authorization for network service 106 to device group 502(2), similar to the discussion above regarding event 6. Alternately, credential management service 504 can provide the authorization for network service 106 to client device 500(A), which in turn can update the devices of group 502(2) similar to the events 10 and 11.

Device group 502(2) can also include client devices having an intermediate degree of authorization. For example, such intermediate types of devices may not be able to authorize requests from other devices, but may be able to add credentials for network services for the group 502(2) in a manner similar to that discussed for devices 500(1) or 500(2). In this manner, credential management service 504 maintains a schema of stored network service credential information for each device group 502, and corresponding schema are dynamically updated and provided to each client device 500 belonging to the group.

Example Data Structures and User Interface

FIG. 6 is a diagram depicting example data storage schema that can be employed to store network service credential information, e.g., on a client device or on credential server device 116 in accordance with the processes and events described regarding FIG. 4 and FIGS. 5A-5C. The example data schema includes a first table 600, which includes columns for network identifier (ID) 602, SSID 604, and password 606. Such a table can be employed to store a set of credentials (e.g., SSID 604 and password 606) to access a network service identified by network ID 602. Each row 608(1)-(N) in table 600 can correspond to a different network service 106, such as a wireless network, wired network, web site, and so forth, and these entries can be updated as, for example, networks change their password requirements and users update their passwords. Moreover, additional rows can be added or existing rows deleted as associations between devices in device groups and various network services 106 are created and ended.

The example data schema of FIG. 6 also includes a second table 610, which stores credentials to enable a user to access the credential management service 504 itself. Such credentials can include a credential service login 612, a credential service password 614, and/or other credentials. Such credentials can be employed to authenticate a user when the user logs into the credential management service 504. Moreover, the entries of table 610 can be edited to add, delete, and/or update credentials.

The example data schema of FIG. 6 also includes a third table 620, which stores information regarding which devices are authorized to access which network services and is subject to the addition or deletion of network services 106 and updating of authorized users and/or devices, as well as changes to restrictions. Table 620 can store information indicating allowed access to network services identified by network ID 622, by authorized user 624 and/or authorized device 626. Table 620 can also include information providing a set of restrictions 628 for each pairing of network service and device. Such restrictions 628 can include restrictions, qualifications, or criteria for the access of an authorized device to a network service.

For example, as shown in table 620, "laptop1" is an authorized device to access network service "Home 1" and "janedoe" is an authorized user that is authorized to access "Home 1" using "laptop1." According to the restriction information for row 630(1), "janedoe" can use "laptop1" to access "Home 1" during the hours of 0800 to 2300, but not otherwise. As illustrated in the examples of rows 630(1)-(N), various embodiments support restrictions of various types including one or more of at least the following:

Temporal restrictions—a user and/or device can access a network service during particular times of day, particular days of the week, particular months of the year, particular types of days (e.g., working days, weekdays, weekends, on holidays, not on holidays, etc.), and/or up to a particular cutoff date/time (e.g., until the end of the month, for the next 10 days, etc.).

User restrictions—particular users can be authorized or not authorized to access particular network services. For example, a parent can provide a child with use of a laptop computer, but can restrict the child from using the laptop to access the parent's work network.

Activity-based restrictions—particular users and/or devices can be restricted from using particular applications or performing certain activities while accessing particular network services. For example, a device can be restricted from accessing a social networking site and/or playing a game application while connected to a business wireless network.

Location-based restrictions—particular users and/or devices can be restricted from accessing particular network services while in particular locations. For example, a device can be restricted from logging into a social network service or game service while the user and/or device is located in a classroom.

Device-based restrictions—particular devices (e.g., child's laptop) or classes of devices (e.g., tablets generally) can be restricted from connecting to particular network services.

Combinations of restrictions—embodiments support any combination of the above restrictions based on particular users, particular devices or classes of devices, temporal restrictions, location-based restrictions, activity-based restrictions, etc.

In at least one implementation, the example data schema of FIG. 6 can be preloaded to a client device 108 or 110 upon user authorization for such preloading, for example during the purchase of a client device 108 or 110. In instances where a user has an existing device group 112, during the purchase of a device 110, which can be configured to operate as part of the group, the purchase process can include a prompt to ascertain if the user would like the group information preloaded on the device being purchased. In this example, the credential management service loads information to the device so that the device will be shipped or otherwise provided to the user with this preloaded information before the device connects to a network service 106. As an alternate example, the credential management service can preconfigure the device so that the first time the user employs the device, group information is downloaded to the device when the device connects to the credential management service or the network service 106. Thus, in either example, the user can receive the new device in a more ready to use state and bypass the typically tedious set up process.

Moreover, the user may want to preconfigure a new device to operate as part of a device group although the user does not have an existing device group. Thus, in some embodiments, during purchase of a first device 108, the purchase process can include a prompt to ascertain if the user would like to register the device with the credential management service and to provide the user an opportunity to provide credentials to authorize access of the device to network services. Again, in some instances, the credential management service loads group information to the device so that the device will be shipped or otherwise provided to the user with this preloaded information before the device connects to a network service 106. In other instances, the credential management service can preconfigure the device with preliminary group information so that the first time the user uses the device additional group information is downloaded to the device when the device connects to the credential management service or a network service 106. Thus, during the initial purchase process, the user can initiate at least partial creation of the example data schema of FIG. 6, and the credential management service can store this schema to be provided to other devices 110 as other devices are registered with device group 112.

Figure 7:
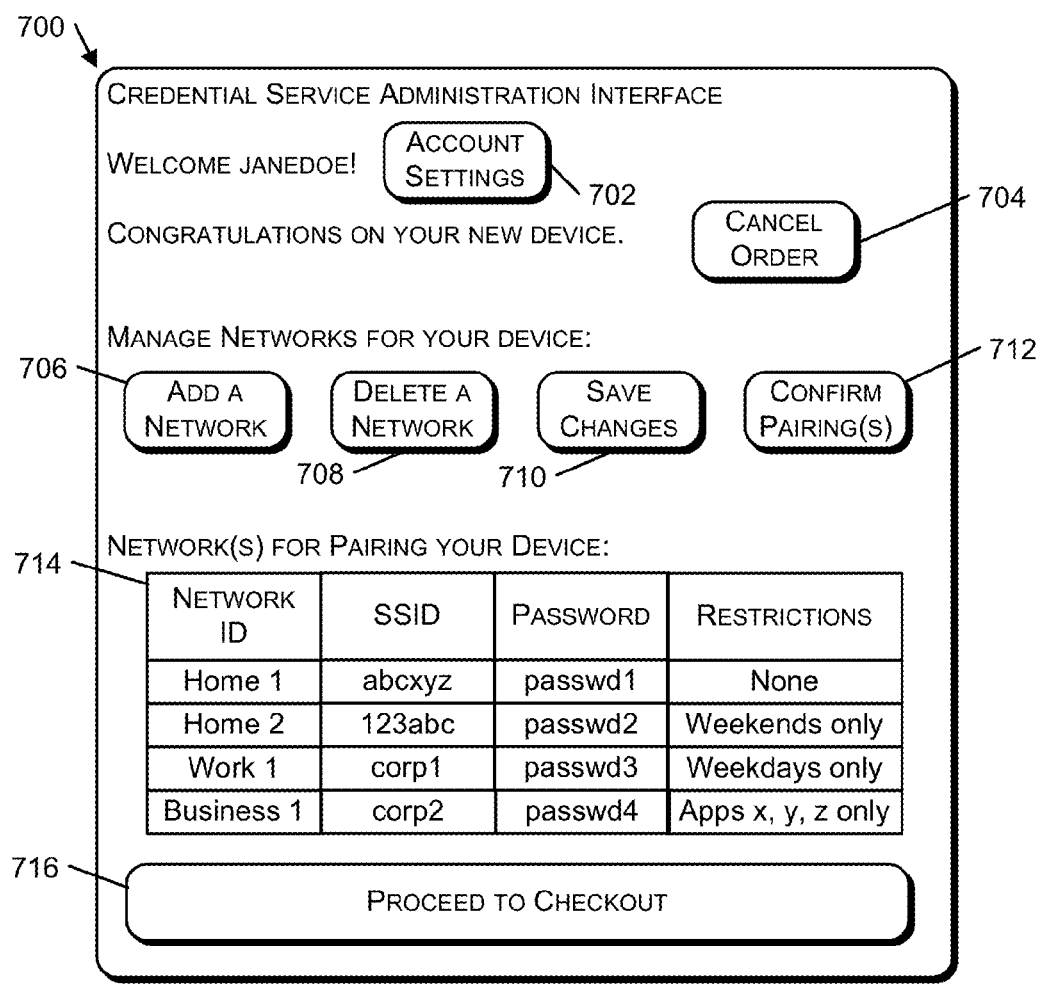
FIG. 7 is a pictorial diagram depicting an example credential management interface that enables a user to preconfigure or preload a device with network service credentials stored by a credential management service during the device purchase process, according to various embodiments.

FIG. 7 is a pictorial diagram depicting an example user interface 700 (e.g., credential service administration interface 212) that may be presented on a device, such as one of the first client device 108 and/or the second client device(s) 110 shown in FIG. 1 and that may be employed by a user to preconfigure a first device 108 or preload a second device 110 with network service credentials stored by the credential management service during the device purchase process. Such an interface can be presented to the user after the user logs in to or is otherwise authenticated to the credential management service.

In the example shown, interface 700 includes functionality such as account settings button 702 to allow a user to navigate to a user interface where the user can view and update settings associated with the user's account including associating the device being purchased with a device group 112. Interface 700 also includes functionality such as a button 704 to allow a user to cancel the order currently in process. Interface 700 can also include buttons to add a network service 706, delete a network service 708, and save changes to the network service(s) 710. Interface 700 can include another button to confirm pairings 712 between the device and network service(s).

Interface 700 can also include a portion 714 identifying the various pairings for the device to network service(s). For example, if a user indicates that the device should be associated with a device group 112 from the account settings, credential management service will populate portion 714 with the network IDs, SSIDs, and passwords for the existing networks associated with the device group. Portion 714 may provide default restrictions associated with each of the networks, or an opportunity for the user to select a restriction for each network, such as from a drop-down menu. Interface 700 may also include functionality such as checkout button 716 to allow a user to proceed to purchase the device when the user is satisfied with the preconfiguration/preloading options the user has selected.

Figure 8:
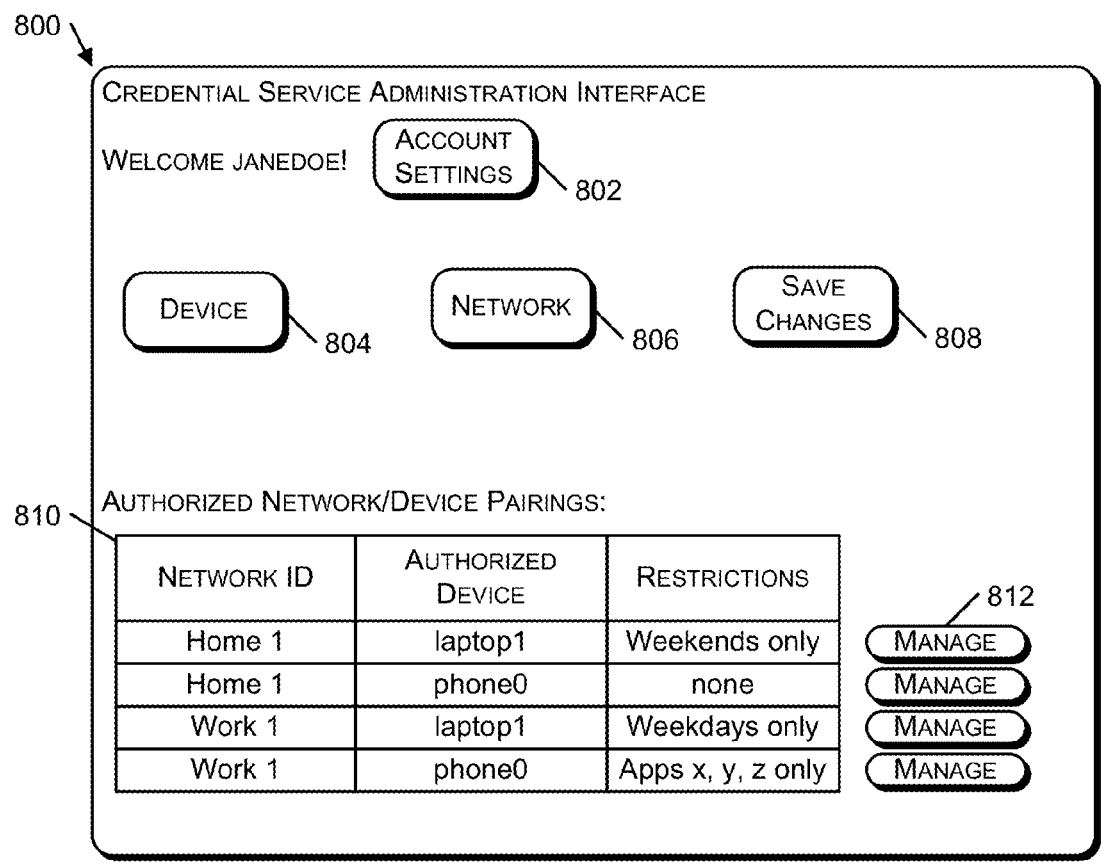
FIG. 8 is a pictorial diagram depicting an example credential management interface that enables a user to access and/or manage network service credentials and authorizations, according to various embodiments.

FIG. 8 is a pictorial diagram depicting an example user interface 800 (e.g., credential service administration interface 212) that may be presented on a client device, such as the first client device 108 and/or the second client device(s) 110 shown in FIG. 1 and that may be employed by a user to access and/or maintain network service credentials stored by the credential management service. Such an interface can be presented on either or both of the client devices to the user after the user logs in to or is otherwise authenticated to the credential management service. In the example shown, interface 800 includes functionality such as account settings button 802 to allow a user to navigate to a user interface where the user can view and/or update account settings such as login/ password, or other credentials to access the credential management service similar to that described above regarding purchase interface 700. In the example shown, interface 800 includes functionality such as a device button 804 to allow a user to add or delete a device, network button 806 to allow a user to add or delete a network, and a save changes button to allow a user to save account level changes. In various implementations the functionality provided via buttons 804, 806, and/or 808 alternately may be accessed via account settings button 802.

Interface 800 can also include a portion 810 identifying the various authorized pairings of device(s) to network service(s) associated with a device group according to the credential management service records of the associations, for example from a data storage schema as described regarding FIG. 6. Moreover, portion 810 identifies whatever restrictions apply to the use of the authorized device with each network service. Meanwhile, for device groups having controlling devices as discussed regarding FIG. 5, a portion similar to portion 810 on the controlling device can identify the restrictions in place for each of the authorized devices in the device group.

Interface 800 can further include controls such as manage button(s) 812, to enable the user to modify the device/network service pairings and/or their restrictions on the device. Such controls can further enable the user to manually enter, edit, and/or delete credentials for the various network service(s) including SSID of the network service, network service login/ password, or other credentials to access the existing network services via the credential management service. When the user adds, deletes, or updates credentials for a network service via a manage button 812, credential management service updates the data storage schema described in FIG. 6 and causes the changes to be propagated to each of the devices of the device group as discussed above regarding FIG. 5.

CONCLUSION

Although the techniques have been described in language specific to structural features and/or methodological acts, it is to be understood that the appended claims are not necessarily limited to the specific features or acts described. Rather, the specific features and acts are disclosed as example implementations of such techniques.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to present that an item, term, etc. may be either X, Y, or Z, or a combination thereof. Thus, such conjunctive language is not generally intended to imply that certain embodiments require at least one of X, at least one of Y, and at least one of Z to each be present.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    receiving, at a credential service implemented in a hosted computing environment, a first communication indicating that a first device has connected to a wireless network, the first communication including a set of credentials employed by the first device for connecting to the wireless network and for connecting to another network;
    determining, by the credential service implemented in the hosted computing environment, that the first device is associated with a device group, the device group including a plurality of devices;
    associating, by the credential service implemented in the hosted computing environment, the set of credentials with the device group, the set of credentials including information describing the first device, the wireless network, and the another network;
    receiving, at the credential service implemented in the hosted computing environment, a second communication indicating that a second device has connected to the wireless network, the second communication including information indicating that the second device is associated with the device group;
    authenticating, by the credential service implemented in the hosted computing environment, the second device, the authenticating to include verifying that the second device is associated with the device group; and
    in response to the second communication:
        providing, by the credential service implemented in the hosted computing environment, the set of credentials to the second device to enable the second device to automatically connect to the another network; and
        associating the second device with the set of credentials.

2. The computer-implemented method of claim 1, further comprising authenticating, by the credential service implemented in the hosted computing environment, a user of the second device based in part on the information in the second communication.

3. The computer-implemented method of claim 1, further comprising authenticating, by the credential service implemented in the hosted computing environment, the first device based in part on information in the first communication.

4. The computer-implemented method of claim 1, further comprising receiving, at the credential service implemented in the hosted computing environment, a third communication including information indicating that a third device is associated with the device group, wherein the set of credentials associated with the device group enables the third device to automatically connect to the wireless network when the third device is in proximity to the wireless network.

5. The computer-implemented method of claim 1, further comprising storing, by the credential service implemented in the hosted computing environment, the set of credentials as a stored set of credentials, wherein the storing is performed at least one of:
    automatically on receiving the first communication; or
    in response to an indication that the set of credentials is to be stored.

6. A system comprising:
    a data store configured to store network service credentials; and
    a computing device including a processor in communication with the data store, the processor configured to:
        receive an indication that a first device has connected to a network service using a set of network service credentials, the first device associated with a device group, wherein the device group comprises a plurality of devices;
        associate, in the data store, the set of network service credentials with the device group; and
        provide the set of network service credentials to the device group, wherein the set of network service credentials enables at least one second device associated with the device group to automatically connect to the network service.

7. The system of claim 6, wherein the network service comprises at least one of a wired network, a wireless network, or a web site.

8. The system of claim 6, wherein the network service comprises a wireless network, and wherein the set of network service credentials enables the at least one second device associated with the device group to automatically connect to the wireless network when the at least one second device is in proximity to the wireless network.

9. The system of claim 6, wherein the computing device is further configured to store, in the data store, the set of network service credentials as a stored set of network service credentials for the network service.

10. The system of claim 6, wherein the plurality of devices in the device group share at least one of a common user and a common user account, and wherein the set of network service credentials is provided to the at least one second device in response to a communication authenticating the common user or the common user account to the computing device.

11. The system of claim 10, wherein the indication that the first device has connected to the network service further includes data that authenticates at least one of the common user and the common user account to the computing device.

12. The system of claim 6, wherein the processor is further configured to generate instructions for presenting a user interface that enables a user to manage access rights to the network service for the device group.

13. The system of claim 6, wherein the indication indicates that the first device is associated with the device group.

14. A computing device comprising:
    a memory configured to store a credential management application;
    a network interface; and
    at least one processor in communication with the memory and the network interface, the at least one processor configured to execute the credential management application to:

authenticate the computing device to a credential service, following establishment of a connection to a first wireless network via the network interface, wherein the credential service is implemented in a hosted computing environment that is independent of the computing device;

receive, from the credential service, a set of credentials to enable the computing device to automatically connect to a second wireless network via the network interface; and based at least in part on the network interface detecting the second wireless network, automatically establish a connection to the second wireless network via the network interface using the set of credentials received from the credential service.

15. The computing device of claim 14, wherein the set of credentials is stored by the credential service following an authentication of at least one other computing device to the credential service through the second wireless network.

16. The computing device of claim 15, wherein the computing device and the at least one other computing device are associated in a device group.

17. The computing device of claim 14, wherein the set of credentials are stored in data storage associated with the credential service.

18. One or more non-transitory computer-readable storage media storing instructions that, when executed, instruct at least one processor to perform actions comprising:

receiving, at a credential server, a first communication to a credential service, the first communication indicating that a device has connected to a network service, the first communication including one or more credentials employed by the device for connecting to the network service, the device operating in a computing environment that is independent of the credential server;

storing, by the credential server, the one or more credentials with information describing the network service;

receiving, at the credential server, a second communication authenticating at least one other device to the credential service, the at least one other device operating in a computing environment that is independent of the credential server; and in response to the second communication, providing the one or more credentials included with the first communication to the at least one other device, the one or more credentials enabling the at least one other device to connect to the network service responsive to detecting the network service.

19. The one or more non-transitory computer-readable storage media of claim 18, wherein the network service comprises at least one of a wired network, a wireless network, a web service, or a web site.

20. The one or more non-transitory computer-readable storage media of claim 18, wherein the device and the at least one other device are in a device group associated with at least one of:

a common user, and a common user account.

21. The one or more non-transitory computer-readable storage media of claim 18, wherein the first communication further authenticates a user of the device to the credential service, and wherein the second communication further authenticates the user to the credential service.

22. The one or more non-transitory computer-readable storage media of claim 18, wherein the device and at least one other device are mobile devices.

23. The one or more non-transitory computer-readable storage media of claim 18, wherein the one or more credentials include information describing the device, the network service, and another network.

24. The one or more non-transitory computer-readable storage media of claim 23, wherein the one or more credentials are stored in a data storage associated with the credential service, and the actions further comprise associating the at least one other device with the one or more credentials in the data storage on receipt of the second communication authenticating at least one other device to the credential service.

25. A computing device comprising:

a memory;

a processor in communication with the memory and a data store, the processor configured to:

receive an indication that a first device has connected to a network service using a set of credentials, the first device associated with a device group, wherein the device group comprises a plurality of devices;

cause to be stored, in the data store, the set of credentials as a stored set of network service credentials for the network service; and provide the stored set of network service credentials to the device group, wherein the stored set of network service credentials enables at least one second device associated with the device group to automatically connect to the network service.

26. The computing device of claim 25, wherein the processor is further configured to associate the at least one second device with the stored set of network service credentials.

27. The computing device of claim 25, wherein the processor is further configured to generate instructions for presenting a user interface that enables a user to manage access rights to the network service for the device group.

* * * * *